United States Patent
Surkau et al.

(10) Patent No.: US 9,251,391 B2
(45) Date of Patent: Feb. 2, 2016

(54) METHOD FOR CONTINUOUS DETECTION OF A PERSONS PRESENCE ON PUBLIC TRANSPORTATION

(71) Applicants: SKIDATA AG, Groedig/Salzburg (AT); EM MICROELECTRONIC-MARIN SA, Marin (CH)

(72) Inventors: Reinhard Surkau, Groedig/Salzburg (AT); Charles Egli, Cheseaux (CH); Francois Fer, Cesson Sevigne (FR); Eric Piret, Cesson Sevigne (FR); Jean-Claude Fournier, Cesson Sevigne (FR); Fabien Maupas, Pontarlier (FR); Oliver Prevost, Pontarlier (FR)

(73) Assignee: SKIDATA AG, Groedig/Salzburg (AT)

( * ) Notice: Subject to any disclaimer, the term of this patent is extended or adjusted under 35 U.S.C. 154(b) by 0 days.

(21) Appl. No.: 14/451,723

(22) Filed: Aug. 5, 2014

(65) Prior Publication Data
US 2015/0090786 A1 Apr. 2, 2015

(30) Foreign Application Priority Data
Aug. 6, 2013 (EP) .................................... 13179391

(51) Int. Cl.
| | | |
|---|---|---|
| *G07B 15/02* | (2011.01) | |
| *G06K 7/10* | (2006.01) | |
| *G06Q 50/30* | (2012.01) | |
| *G07C 9/00* | (2006.01) | |
| *G07C 1/10* | (2006.01) | |

(52) U.S. Cl.
CPC ............ *G06K 7/10425* (2013.01); *G06Q 50/30* (2013.01); *G07C 9/00111* (2013.01); *G07B 15/02* (2013.01); *G07C 1/10* (2013.01)

(58) Field of Classification Search
CPC ....... G07B 15/02; G07B 15/04; G07B 15/063
USPC ........................ 235/384, 385, 462.46, 472.02
See application file for complete search history.

(56) References Cited

U.S. PATENT DOCUMENTS

| | | | |
|---|---|---|---|
| 7,512,236 B1 | 3/2009 | Zhu | |
| 2002/0089434 A1* | 7/2002 | Ghazarian | ..................... 340/988 |
| 2005/0101314 A1* | 5/2005 | Levi | ............................. 455/423 |

FOREIGN PATENT DOCUMENTS

| | | |
|---|---|---|
| DE | 69929492 T2 | 9/2006 |
| EP | 1638052 A1 | 9/2004 |
| WO | 0120557 A1 | 3/2001 |

*Primary Examiner* — Daniel St Cyr
(74) *Attorney, Agent, or Firm* — Karl F. Milde, Jr.; Eckert Seamans Cherin & Mellott, LLC

(57) ABSTRACT

A method for continuous determination of a person's presence in a public transport conveyance is proposed, where a customer medium comprising an RF transceiver is assigned to the person, where at least one reading device per passenger compartment or car is provided for data communication with the customer media in the conveyance, which is connected to a computer serving as an on-board unit for the purpose of data communications, where these are also connected to each other in the case that several reading devices are provided, where an on-board unit serving as the main on-board unit is assigned to a passenger compartment or car if several passenger compartments or cars are present, and the other passenger compartments or cars are assigned to on-board units serving as secondary on-board units, which are connected to the main on-board unit for the purpose of data communication, where the customer medium is in a "sleep" mode upon entering the transport in order to keep energy consumption as low as possible.

19 Claims, 1 Drawing Sheet

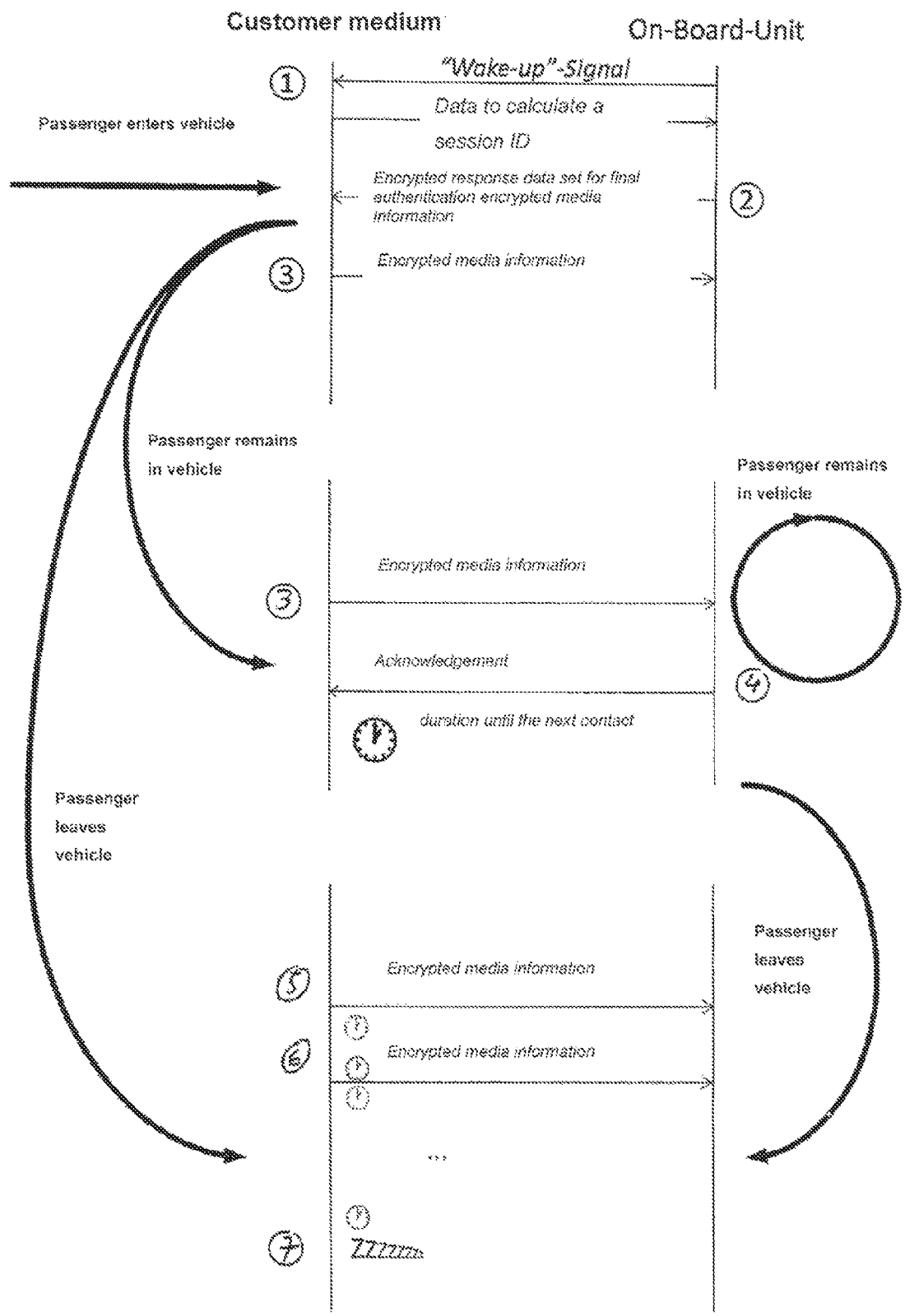

METHOD FOR CONTINUOUS DETECTION OF A PERSONS PRESENCE ON PUBLIC TRANSPORTATION

BACKGROUND OF THE INVENTION

The present invention relates to a method for continuous detection of a persons presence on public transportation. In particular, the invention relates to a method for realizing a "Be-in-be-out" ticket collection system.

"Be-in-be-out" ticket collection systems are becoming increasingly popular because they offer the utmost comfort to the passengers of public transportation. As part of such systems, the duration of a passenger's presence in a public transport vehicle should be determined and associated with the route travelled within this time. In comparison, in "check-in check-out" systems the passengers ticket is collected upon getting in and out.

SUMMARY OF THE INVENTION

The present invention has taken upon itself the task to provide a method for the continuous detection of a persons presence on public transportation, in particular a process for the realisation of a "Be-in-be-out" ticket collection system, through the implementation of which the presence of the person in a public transport vehicle can be detected with the least possible effort in design with high data security and probability.

Accordingly, a method for the continuous detection of a persons presence on public transportation is proposed, as part of which the person is assigned to a customer medium, which includes an RF transceiver, whereby at least one, preferably several reading devices for data communication with the customer media that are interconnected and connected to a computer serving as an on-board unit preferably via a CAN bus are provided in the transport conveyance in each passenger compartment or car.

The customer medium preferably has its own power supply. As part of further embodiments, the customer medium is designed in such a manner that it is charged with energy via an HF pulse, which is emitted from at least one reading device, thus the required energy can be taken from the field of the reading device and then can be operated autonomously for a predetermined time. For this purpose, the customer medium features a capacitor for storing energy and a corresponding switching circuit. The pulse is preferably a pulse in UHF-range, for example, a pulse with the frequency of 433 MHz, 860 to 960 MHz, 2.4 GHz. Also, it is possible to provide sufficient energy on transit through a gate at the entrance of the transport in form of magnetic fields of 13 MHz.

In the event that there axe multiple passenger compartments or cars, a passenger compartment or car is assigned to an on-board unit serving as a main on-board unit, whereby the other passenger compartments or cars assigned to on-board units serving as secondary on-board units, whereby the secondary on-board units are connected with the main on-board unit for the purpose of data communication. The reading devices in terms of the invention can also describe the customer medium or send information, and commands to the customer medium.

Upon entering the conveyance, the customer media are in a "sleep" mode, whereby there is substantially no electrical activity in sleep mode, and whereby the battery that supplies the customer medium with energy is hardly burdened in the event of an own electricity supply to the customer medium. The outboard unit of the passenger compartment sends a "wake-up" signal at regular intervals as part of a wake-up phase, which is sequentially emitted from all reading devices connected to the on-board unit. If the customer medium receives this "wake-up" signal and the signal is recognised as valid, this leads to the activation of the customer medium and thus to the exit of the medium from the sleep mode.

In the event that the customer medium does not feature its own power supply, the "wake-up" signal can be included in the HF pulse. Further, in the event that the customer medium is not provided with its own power supply, that an HF signal is sent in regular, predetermined time intervals from at least one reading device in order to energise the customer media located within range.

Subsequently, data for the calculation of a session ID, which is received fey at least one reading device, are sent from the customer medium to the on-board unit in the passenger compartment via the bus system, via which at least one reading device is connected with the on-board unit.

The calculation of the session ID is preferably based on the known "challenge response" method. Accordingly, the on-board unit responds after receiving the first dataset from the customer data record medium with another dataset. In each case, both data sets are offset with further information (algorithms, keys) only present in the customer medium and in the on-board unit and used to determine the session ID. The information only present in the customer medium and in the on-board unit is alien to an overhearing third party, so that, ultimately, only the dataset known to the customer medium and the on-board unit is present with the session ID. This is used for safeguarding such as authentications. After the calculation of the session ID, a media information, by which the customer medium is uniquely identified and which can be used to determine, for example, whether there is an authorisation for a particular trip, can be sent from the customer medium.

Preferably, the communication between the on-board unit and the customer medium is encrypted and optionally signed, whereby the encryption for each customer medium is different. Here, a mutual authentication can be performed as part of a further development of the invention prior to the actual communication between the on-board unit and the customer medium, so that this customer medium is marked as known and authenticated in the on-board unit, whereby a secure connection is set up as part of the authentication between the customer medium and an on-board unit, so that the required information of the customer medium can be transferred in a safe and indisputable manner. The customer medium is recognised as unique via the session ID, whereby the session id is valid for the duration of a valid authentication and is independent from the other transferred information. Its indisputable arises from the additional use of a time stamp in the marking. This time stamp is incremented per communication, so that each message, which is additionally marked, constitutes a unique, safe dataset.

Preferably, the customer medium includes a first, a second and a third antenna, which are implemented on a PCB substrate. The antennas of the customer medium can be implemented as dipoles, folded dipoles, "inverted F" antennas, quadrupole antennas, similar patch antennas or antenna loops and coils.

Here, the first antenna is preferably designed in the range 13 MHz-8 GHz and is used as a wake-up antenna for receiving a wake-up signal when the customer medium is in a "sleep" mode. The wake-up signal is preferably transmitted as amplitude-modulated, and includes a predetermined signal sequence, whereby the signal from a wake-up antenna is amplified and demodulated by operational amplifier serving as a detection module, and is evaluated by a microprocessor partially activated in the "sleep mode", so when a wake-up signal is detected as valid, a signal with the proper sequence, the microprocessor is fully activated and the transceiver of the customer medium is turned on, whereby the customer medium goes into an active mode. The operational amplifier is the only component of the customer medium that is fully active in the "Sleep"-mode, and is configured in such a manner that it has minimum power consumption. In addition, only a part of the microprocessor is activated in the "sleep mode". Moreover, the customer medium also has an idle mode, in which only the microprocessor is active in order to control the transition into "Sleep" mode or into the active mode according to predetermined routines. The microprocessor of the customer medium therefore has different modes of activity.

The second antenna receives and transmits preferably in the range of 2.4 GHz-8 GHz and is connected to an RF transceiver, whereby the transceiver can be activated only if the customer medium in active mode. The bit rate of the transceiver is preferably 1 or 2 Mbit/s. Data communication with corresponding reading devices can be performed via the transceiver over multiple channels with slightly different frequencies or with broadband signals in order to avoid interference with external services and to allow for rapid contact.

In order to reduce a risk of disruption during data transmission, a continuous change of the data channels is enabled by the transceiver (frequency hopping). For example, three "advertising channels" can be used for data transmission via the second antenna in the 2.4 GHz band to make contact with a reading device, and five "communication channels" can be used for data communication with the reading device.

The first and the second antenna are used for long-range data communication with at least one reading device of a system for detecting an access authorisation stored on the customer medium, or to acquire the media information of the customer medium, for reading data stored in the customer medium and/or for describing the customer medium. Long-range data communication in terms of the invention is a data communication with a range of more than one meter.

The third antenna is an antenna, preferably for the range around 13.58 MHz, which is connected to an NFC-module in the integrated circuit of the customer medium. The NFC module is preferably implemented in accordance with the ISO 18092 standard and the safety mechanisms used there and is used for the short-range data communication in the range of a few centimeters in active mode of the customer medium, for example, with a mobile control device for checking the validity of an access authorisation stored on the customer medium or for reviewing personal data.

The customer medium therefore features a "sleep" mode, an idle mode and an active mode, whereby only the operational amplifier and a part of the microprocessor are activated in "sleep" mode. The microprocessor of the customer medium is largely turned off in "sleep"-mode and fully turned on in idle mode and active mode, whereby the transceiver is turned off in "sleep"-mode and in idle mode and is turned on only in active mode. In this way, the energy consumption of the customer medium is kept as low as possible.

The customer medium features an integrated circuit connected to the microprocessor, which comprises at least one crypto-engine, whereby preferably three crypto-engines are included, for example, for GRAIN 128, GRAIN 128A, 3-DES or AES-128. The microprocessor or the NFC-module can also be integrated into the integrated circuit.

In the following, a method of the invention is elaborated for the case that authentication is performed and encrypted communication between the on-board unit and the customer medium takes place. However, all the steps of the method can be carried out without authentication and without encryption/decryption. Furthermore, as part of a further embodiment of the invention, in which no encryption or authentication is provided, the session ID can be the media information of the customer medium, such as a biunique number that is immediately sent to the computer after the transition to the active mode.

According to a preferred embodiment of the invention it is provided that the customer medium sends encrypted media information after the authentication, which is received via at least one reading device and is supplemented by the reading device ID and optionally the signal strength, with which the signal has been received by the reading device, and forwarded to the on-board unit. In the on-board unit, the media information is decrypted and processed, an acknowledgement containing a time stamp and the duration until the next contact to send the next encrypted and marked media information to the on-board unit via the reading devices is sent. Based on the media information, it can be determined whether the person biuniquely assigned to the customer medium has obtained the authorisation to ride on the conveyance.

Advantageously, the predetermined duration can be dynamically adjusted until the next contact, in order to accommodate, for example, a traffic situation for the case of a bus or bus stop density, for the case of a tram or a train in this way. Here, it can be provided that the acknowledgement is transmitted via all reading devices of the passenger compartment with a slight time lag, thereby assuring that the customer medium receives the acknowledgement with a high probability. The acknowledgement is encrypted individually for each customer medium, thereby ensuring that only that customer medium receives the acknowledgement, which has transmitted its identity. In this way, only this one customer medium is put into an idle mode.

The customer medium receives the acknowledgement and goes into an idle mode in which the power consumption is very low, whereby the change into idle mode does not delete the already occurred authentication. After the predetermined time until the next contact, the customer medium enters the active mode and sends its media information as encrypted and optionally signed to the on-board unit via at least one reading device.

The corresponding signal of the customer medium is detected by at least one reading device and forwarded to the on-board unit, whereby the receipt of the identity of the customer medium is answered with the re-transmission of an acknowledgement, which is generated by the on-board unit and sent by the reading device.

After receiving the acknowledgement, the customer medium is put into idle mode, from which it returns after the specified time interval in order to be reported once again to the on-board unit with the encrypted and optionally marked identity via the reading devices. The incremented time stamp per response of the reading device is used in addition to sorting tasks of the signature calculation, since thereby the uniqueness of the signature is ensured, as already explained.

The described procedure is repeated until the change of customer medium to the sleep mode, which takes place if it is not possible for the customer medium after a predetermined number of attempts to get an acknowledgement on the transmission of the encrypted media information from the on-board unit.

In the case that the customer medium is in transport, this may be caused by the fact that the channel choice between the customer media and reading devices does not match, that the on-board unit is in a wake-up phase for other customer media and is connected to other channels or that interference has occurred with another transmitter. Additionally, this can be caused by the fact that the customer medium is no longer located in the conveyance.

If the customer medium does not receive any acknowledgement from the on-board unit within a predetermined time period, the encrypted media information is sent again, whereby the customer medium enters the "Sleep" mode, if it does not receive any acknowledgement of the transmission of the encrypted media information from the on-board unit after a predetermined number of attempts after a respective predetermined period of time. As part of the procedure, this situation corresponds to the event of the person leaving the transport, to whom the customer medium is assigned.

Resending the media information is done in the same interval i.e. interval, as previously determined by the on-board unit, or in other, usually more frequent intervals. This increases the probability that it quickly comes to the valid re-detection of the customer medium in case of a communication interference and the customer medium is not inadvertently placed in the sleep mode.

In the event that the customer medium has been put in a sleep mode, it can only be detected and registered with a renewed wake-up signal and subsequent renewed mutual authentication, as already explained, whereby the renewed registration features a new, different encryption and optional marking. Consequently, a certain encryption and marking is only valid for one customer medium and one registration. The registration lasts as long as the customer medium is not put in a sleep mode. A wake-up signal can be processed only in sleep mode.

For a full understanding of the present invention, reference should now be made to the following detailed description of the preferred embodiments of the invention as illustrated in the accompanying drawing.

BRIEF DESCRIPTION OF THE DRAWING

FIG. 1 is a time diagram showing the chronological order of the steps in the method of the present invention.

DESCRIPTION PREFERRED EMBODIMENT

In the example shown in the accompanying FIGURE, the customer medium in sleep mode receives a wake-up signal upon entering the coveyance by a person with a customer medium, which is sent by the on-board unit via the designated reading devices and enters the active mode in case a valid wake-up signal is recognised, whereby the data to calculate a session id is transmitted from the customer medium to the on-board unit (step 1). The on-board unit, upon receiving this data, sends an encrypted dataset for the final authentication (step 2), whereby an encrypted media information is then sent from the customer medium, which is received by the on-board unit by means of at least one reading device (Step 3). The on-board unit receives the media information and sends an acknowledgement that is received by the customer medium, if the person remains in the conveyance (step 4). The acknowledgement contains the duration until the next contact from the customer medium. If the person remains in the conveyance, steps 3 and 4 repeat until the person leaves the conveyance, where in this case the customer medium cannot receive an acknowledgement from the on-board unit after repeated sending of media information (steps 5, 6) and enters the sleep mode (step 7). In the case that the person leaves the conveyance after authentication and as the case may be, after sending the media information, the customer medium cannot receive any acknowledgement from the on-board unit and also enters the sleep mode (step 7).

For the data transfer, several "advertising channels" are used to make contact and several "communication channels" are used preferably in the 2.4 GHz ISM band for data communication between customer medium and reading devices.

The wake-up signal is a signal, in the 2.4 GHz range, and is sent to one of possibly several, preferably three "advertising channels". After a recognised, valid wake-up signal and transition of the customer medium to active mode, the data used to calculate the session ID are likewise sent to one of the "advertising channels", by which the customer medium suggests a communication channel.

The underlying algorithm is designed in such a manner that interference with regard to the communication channel can be stochastically prevented.

Subsequently, the customer medium waits for a response for a predetermined time in the receive-mode, whereby the predetermined time is preferably equal to 10 times the transmission time, so that the on-board unit is allowed sufficient time for a temporal overlap with the transmission interval of the customer medium for receiving the session ID.

If a customer medium has not received any response after this time, it changes to the next "advertising channel", and the data for the calculation of a session ID are seat again, whereby this is repeated until a response signal is received by a reading device, and the authentication starts.

If contact with the on-board unit with all potential "advertising channels" has been attempted without avail, the customer medium enters the sleep mode in order to send data to calculate a session ID again after a predetermined time.

After the transmission of the wake-up signal, the "advertising channels" are monitored by the reading device, which has sent the signal, whereby the reading device changes after a predetermined waiting time from one channel to the next. Here, the duration of the time window for listening to the channels for the reading device is adapted in such a manner that with a sufficient number of reading devices at least one reading device per advertising channel is in a listening mode, which allows for fast detection and authentication of customer media.

If a customer medium is detected, that is, if the data to calculate a session id has been received, the authentication begins, whereby customer medium and reading devices switch to an associated "communication channel". The subsequent communication between customer medium and reading devices takes place in one of the "communication channels", preferably 5 "communication channels" are provided.

As part of a further development of the invention, it is also possible to send information back to the customer medium acknowledging of the detection of the customer medium, which can be displayed for example on a display of the customer medium.

Thanks to the concept described, a customer medium is spatially detected within a certain period of time, whereby a series of datasets is generated per customer medium, containing at least the initial time of detection, the identity of the customer medium (for example, a preferably encrypted customer medium ID number), ID number of the reading device via which the signal of the customer medium has been received, the signal strength with which the signal from the reading device has been received, and optionally the run-time of the signal in particular in the case of a communication in a high GHz band (for example, 3 to 8-GHz).

For the determination of a run-time, the delays in the response between on-board unit and customer medium or vice-versa are evaluated.

The series of datasets begins with the authentication and ends with the deletion of the authentication, whereby they will continue after re-authentication regardless of a change in encryption and marking. With this, it is possible to merge individual datasets with different authentications downstream.

Based on the datasets, a log of the locations of a customer medium in the vicinity of certain reading devices is created as a function of time.

It can be seen that the series of datasets can include datasets differing only in the ID of the reading device, whereby the datasets are sorted preferably in accordance with the time of detection and, as the case may be, according to the ID of the reading device via which the signal from the customer medium has been received. In this way, a series of local area raw data is generated per customer media and on-board unit, i.e. per customer medium and passenger compartment or car and is preferably stored in the main on-board unit.

For the case that the conveyance includes several passenger compartments or cars, the depicted detection of a customer medium per passenger compartment is carried out as described, whereby per the invention a space is defined as a passenger compartment, which is assigned to an on-board unit with connected reading devices. The on-board units are interconnected, preferably wireless, for the purpose of data communications. For example, the connection can be used for data communication via a GSM network or via a WLAN-connection or other wireless standards.

According to the invention, it is provided that any on-board unit generates its own datasets, as already described, whereby the individual datasets of the on-board units per customer medium and on-board unit is transmitted to the main on-board unit, where they are merged to a single dataset per customer medium, detected by the session ID or—optionally upon possibility of a decryption—by the media information, by the customer medium ID.

Preferably, this data transmission is carried out continuously or at predetermined intervals, such that the on-board sub-units do not require a large memory space for temporary storage of datasets. This yields the advantage that the datasets are present in the main on-board unit promptly and as fully as possible, where they can be completely analysed or forwarded, if they can be merged on the basis of unique IDs. If this is not the case, the analysis of the datasets can be carried out according to a further decryption of the actual customer medium ID in a data centre, to which the data is transmitted from the main on-board unit.

When evaluating the datasets of the local area raw data, multiple detections of a customer medium ideally accrue through different reading devices per time interval, assuming that the local motion of a customer medium within a time interval is small and therefore, that a customer medium is to be considered as stationary in a time interval. Since, as explained above, the reading devices provide optional information on the intensity or the run-time of the signal received from the customer medium, the distance of the customer medium to each reading device, which has received a signal from this customer medium, can be estimated on the basis of these signals, by which a precise localisation can be achieved.

In the 433 MHz range, a spatial accuracy can be achieved up to 1 m with clear line of sight between transmitter and multiple receivers, where the strength and direction of the signals sent from the RF transceivers of the customer media are affected due to the reflections of signals often occurring in public transportation, so that an estimation of the distance of the customer medium is associated to each reading device with a higher uncertainty. If one uses higher frequencies instead of this or the first proposed frequency of 2.45 GHz, durations can be so measured more accurately on the basis of very short pulses and the most relevant signal can be determined for location calculation upon the occurrence of multiple reflections on the basis of signal strength. For this reason, it is proposed, in particular in the case of communication in a frequency range above 3 GHz to detect more accurately the duration of the signal of the customer medium by the reading device in order to estimate the distance of the customer medium to each reading device, which has received a signal from this customer medium. The accuracy of the measurement of distance to a reading device can thus increase to 0.5 m, under ideal conditions to 0.2 m or better.

Accordingly, a most likely location of a customer medium is determined in relation to the reading devices for each time interval, which have received the signals from the customer medium in the respective time interval, so that a trace of the most likely movement of a customer medium in a conveyance can be detected over a series of time intervals.

The most probable location of a customer medium can be specified with a higher accuracy by the averaged location information of several time intervals, whereby it can be determined from a consideration of the most probable locations, whether the customer medium is located rather inside or outside the vehicle.

Accordingly, a limited localisation of a customer medium in a conveyance can be performed by evaluation of multiple received signals from different reading devices per time interval, thereby generating first in/out information. By considering several time intervals together, the most probable location of a customer medium in a conveyance can be specified precisely, so that the reliability of the in/out information increases. An overall trip-time-information for a customer medium can thus be created by linking with external location information of the conveyance itself for the same time interval, where registration patterns arise along the time intervals and/or the location information of the conveyance, which allow an even more accurate assessment.

The local location information relating to a customer medium is linked to the global location information of the conveyance as a function of time, thus resulting in a overall distance travelled for the customer medium. Preferably, the local location information is linked with the global location information of the conveyance over time intervals of equal duration. If there is a high probability that the customer medium is inside the conveyance for a large number of locations along the route, a regular passenger ride in this conveyance is to be assumed, whereas a ride is to be regarded as rather unlikely, if with high probability it is determined that the customer medium has been found to be located outside the vehicle.

For detecting the global location data of a conveyance, the location coordinates of the conveyance can be taken as a function of time along a route and assigned to time intervals, whereby the length of the time intervals is determined by the type of trip and by the type of conveyance and/or the traffic scenario, for example, it is smaller for a city bus than for a train. The length of the time interval is preferably determined by the main on-board unit by means of appropriate algorithms and can be changed dynamically, for example, in dependence on the traffic scenario and the use of the transport. These time intervals can also be used to detect the local location data of a customer medium.

For each trip of the conveyance, location information is stored, which is assigned to time intervals that divide a trip into segments. The closing of the doors of the transport is the starting signal for a trip, whereby the collection of global location information ends for a trip upon arriving at a station, which is recognised by the opening at least one door of the conveyance when it comes to a full stop.

The location information can be obtained, for example, via GPS, whereby information from WLAN-stations is used in railway stations or depots or stops in the event that no GPS signals are available. For the case that a longer time has elapsed between two GPS signals, a trip can be interpolated between the respective GPS locations.

Alternatively, or in addition to the WLAN-information, location information can also be determined based on GSM networks. Furthermore, data from an inertial navigation can also be used. Here, it is possible to determine the corresponding location information from the knowledge of a starting point, the speed and the acceleration as a function of time. These systems are now cheaply and reliably producible on basis of semiconductor products.

There has thus been shown and described a novel method for continuous detection of a persons presence on public transportation which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for continuous determination of the presence of a person in a public transport conveyance, wherein a customer medium comprising an RF transceiver is assigned to the person; wherein at least one reading device per passenger compartment or car is provided for data communication with the customer media in the conveyance, each reading device being connected to a computer serving as an on-board unit for the purpose of data communications and, in the case where several reading devices are provided, such reading devices are connected to each other; wherein an on-board unit serving as the main on-board unit is assigned to a passenger compartment or car if several passenger compartments or cars are present; wherein other passenger compartments or cars are assigned to on-board units serving as secondary on-board units that are connected to the main on-board unit for the purpose of data communication; wherein the customer media are in a "sleep" mode upon entering the conveyance in order to keep energy consumption as low as possible, said method comprising the following steps:

a) sending a "wake-up signal" via the on-board unit of the passenger compartment at regular intervals, which is sequentially emitted by all reading devices, which are connected to the on-board unit;

b) receiving the wake-up signal from customer medium and activating the customer medium if a wake-up signal is recognized as valid; the customer medium then leaves the sleep mode and goes into an active mode;

c) sending data for the calculation of a session ID from the customer medium which is sent from at least one reading device and transmitted to the on-board unit in the passenger compartment via the bus system, through which at least one reading device is connected to the on-board unit, and transmitting a time stamp to the customer medium by at least one reading device;

d) when a session ID exists, sending a media information from the customer medium;

e) receiving the media information via at least one reading device and completing the received information with the reading device ID and forwarding this information to the on-board unit;

f) processing the media information in the on-board unit and sending an acknowledgement containing a new time stamp;

g) receiving the acknowledgement from the customer medium and transition of customer media into an idle mode;

h) transitioning the customer medium into the active mode after a predetermined time interval until the next contact and transmitting the media information to the on-board unit via the at least one reading device, wherein said time interval until the next contact is dynamically adapted;

i) repeating the steps e) through h) until media information is not received by any reading device, whereby the person who is assigned to the customer medium is detected as having left the transport, and the customer medium enters the sleep mode, whereby, if the customer medium has entered the sleep mode, such medium can again be detected and registered only with a renewed wake-up signal; and j) creating a series of datasets, including at least the earliest timestamp of the customer medium, the identity of the customer medium, the ID number of the reading device via which the signal from the customer medium is received, wherein the series of datasets begins with the first reception of the media information and ends with the last reception of media information, wherein the process is continued after a new detection and registration and wherein a log of the locations of a customer medium in the vicinity of certain reading devices as a function of time is created on the basis of the datasets.

2. The method according to claim 1, wherein, if the customer medium does not receive any acknowledgement of the on-board unit within a predetermined time period, the media information is sent again, and wherein the customer medium enters the "sleep" mode if the customer medium does not receive any acknowledgement of sending media information from the on-board unit after a predetermined number of attempts after a respective predetermined period of time.

3. The method according to claim 1, wherein in the event that the customer medium enters the "sleep" mode, the customer medium can only be detected with a new wake-up signal, whereby a wake-up signal can be processed only in the "sleep" mode.

4. The method according to claim 1, wherein a customer medium in a time interval of the duration until the next contact is considered to be stationary and, for each time interval, a most probable location of a customer medium is determined in relation to the reading devices, which have received the signals from the customer medium in the respective time interval, so that a trail of the most probable movement of a customer medium in a vehicle is determined over a series of time intervals, and wherein the most probable location of a customer medium is determined by the average location information of several time intervals, such that the location of such customer medium can be determined from the consideration of the most probable locations, whether the customer medium is more inside or outside the vehicle.

5. The method according to claim 1, wherein, in the event the conveyance comprises several passenger compartments or cars, each on-board unit generates each compartment's or car's own datasets, and wherein the individual datasets of the on-board units per customer media are transmitted to the main on-board unit, where they are merged into a single dataset per customer medium.

6. The method according to claim 1, wherein the local location information relating to a customer medium are connected with the global location information of the conveyance as a function of time, so that an overall route for the customer medium is determined, and wherein, if a large number of locations along the route indicate a high probability that the customer medium stayed in the conveyance, a regular passenger ride in this conveyance is assumed to have occurred.

7. The method according to claim 6, wherein the local location information relating to a customer is linked with the global location information of the conveyance over time intervals of equal duration.

8. The method according to claim 6, wherein the location coordinates of the conveyance are taken as a function of time and are allocated time intervals for the detection of the global location data of the transport along a route, and wherein the length of time intervals is determined by the type of trip, type of conveyance and/or the traffic condition.

9. The method according to claim 6, wherein for each trip of the conveyance, location information is stored which are assigned to time intervals segmented along distances; wherein the closing of the doors of a conveyance is the starting signal for a trip, and wherein the collection of global location information for a trip ends upon arriving at a station, which is recognized by the opening of at least one door of the conveyance when the conveyance comes to a standstill.

10. The method according to claim 6, wherein the location information is obtained via GPS, wherein information from wireless stations in railway stations or depots or stations is used for the case that no GPS signals are available, and wherein a trip is interpolated between the respective GPS locations in the case that a longer time has elapsed between two GPS signals.

11. The method according to claim 10, wherein location information is alternatively determined based on GSM networks or inertial navigation equipment or in addition to the wireless information.

12. The method according to claim 1, wherein the customer medium includes the medium's own power supply.

13. The method according to claim 1, wherein the customer medium is charged with energy via an HF-pulse, and then operates autonomously for a predetermined time.

14. The method according to claim 13, wherein the "wake-up signal" is included in the HF-pulse.

15. The method according to claim 13, wherein at regular predetermined time intervals an RF signal is emitted by at least one reading device in order to energize the customer media with energy within reach.

16. The method according to claim 1, wherein, after transmission of the data to calculate a session ID by the customer medium, which are received by at least one reading device and are sent to the on-board unit in the passenger compartment via the bus system by which the at least one reading device is connected with the on-board unit, in the next step a mutual authentication between the on-board unit and the customer medium is carried out and this customer medium in the on-board unit is marked as known and authenticated; wherein such authentication is not deleted in the case of a transition from the active mode to the idle mode; and wherein the authentication is deleted in the case of a transition to the sleep mode, whereby the customer medium is detected and registered only with a renewed wake-up signal subsequent to a renewed mutual authentication if the customer medium has entered the sleep mode.

17. The method according to claim 16, wherein, after completion of the mutual authentication, the communication between the on-board unit and the customer medium occurs as encrypted and is optionally marked, whereby the encryption and signature are different for each customer medium and whereby the re-registration features a new, different encryption and possible marking after a re-authentication.

18. The method according to claim 1, wherein, after the reception of the media information via at least one reading device, this information is supplemented by the signal strength with which the signal has been received by the reading device and by the duration of the signal in the event of communication in a high GHz range, before such information is forwarded to the on-board unit, whereby this information is included in the generated datasets.

19. The method according to claim 1, wherein, after processing the media information in the on-board unit, the acknowledgement containing a new time stamp includes the duration until the next contact by the customer medium.

* * * * *